United States Patent [19]

Fries et al.

[11] Patent Number: 5,115,111
[45] Date of Patent: May 19, 1992

[54] DUAL TIP ROTATING WELDING ELECTRODE

[75] Inventors: William M. Fries, San Diego; Thomas L. Ratledge, Carlsbad; William H. Hill, Pala, all of Calif.

[73] Assignee: Hughes Aircraft Company, Los Angeles, Calif.

[21] Appl. No.: 563,014

[22] Filed: Aug. 6, 1990

[51] Int. Cl.⁵ ............................................. B23K 11/31
[52] U.S. Cl. .................................................. 219/56.21
[58] Field of Search ................. 219/56.21, 87, 86.25, 219/86.41, 86.9, 119, 56, 56.1, 86.33, 120

[56] References Cited

U.S. PATENT DOCUMENTS

| | | | |
|---|---|---|---|
| 3,348,018 | 10/1967 | Wood | 219/119 |
| 4,171,477 | 10/1979 | Funari | 219/56 |
| 4,465,913 | 8/1984 | Stokoe et al. | 219/56.1 |
| 4,500,769 | 2/1985 | Tincher | 219/86.33 |
| 4,724,294 | 2/1988 | Klein | 219/87 |
| 4,762,976 | 8/1988 | Miller et al. | 219/119 |
| 4,894,507 | 1/1990 | Thode | 219/86.25 |
| 4,916,271 | 4/1990 | Lee et al. | 219/120 |

Primary Examiner—Geoffrey S. Evans
Attorney, Agent, or Firm—Terje Gudmestad; Wanda K. Denson-Low

[57] ABSTRACT

Two parallel elongated closely spaced electrodes for welding electronic circuit components are mounted for limited rotation about an axis extending generally longitudinally of the electrodes to allow the electrode pair to be oriented with respect to a workpiece without angularly moving the workpiece. The electrodes are mounted in a pair of mutually aligned and mutually insulated bobbins against which are firmly pressed a pair of contacts for conducting weld current between the electrodes. The bobbins and the electrodes mounted therein are free to rotate relative to the fixed contacts, but the latter are firmly pressed against the bobbins to provide increased contact pressure and decreased electrical resistance between the contacts and bobbins and to provide a relatively large surface area for such contact.

18 Claims, 2 Drawing Sheets

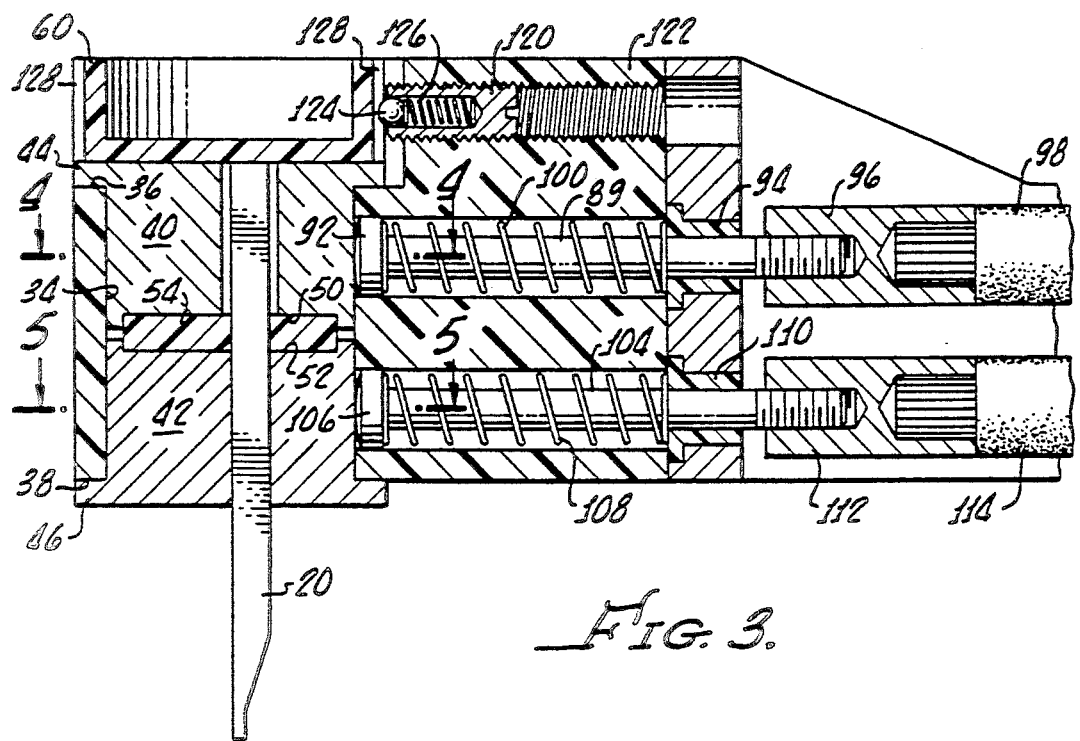
FIG. 3.
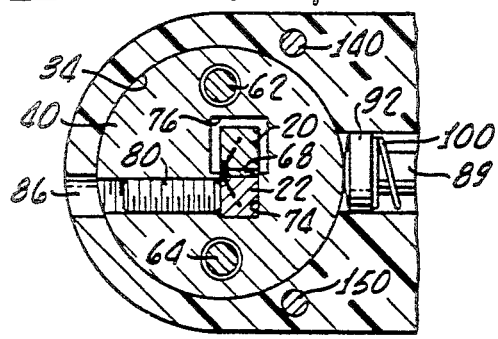
FIG. 4.
FIG. 5.
FIG. 6.

DUAL TIP ROTATING WELDING ELECTRODE

BACKGROUND OF THE INVENTION

1. Field of the Invention

The present invention relates to welding of electronic circuit components and, more particularly, concerns improved mounting of welding electrodes to enhance and facilitate such welding.

2. Description of Related Art

Resistance welding of electronic circuit components can be carried out by a pair of elongated parallel electrodes, sometimes known as "duo-tip" electrodes, which are closely spaced but mutually insulated from one another and have tips that are designed to be moved down upon an area to be welded. When welding current is applied to the electrodes, current flows between the electrode tips through the parts of the workpiece to be welded. Flow of current through the workpiece between the electrodes has a preferred orientation with respect to the orientation of the workpiece. However, the various components in the workpiece may be differently oriented with respect to one another, requiring variable orientation of the workpiece relative to the electrodes. The fixed orientation of welding electrodes in resistance welding weld heads requires that the workpiece, together with the components mounted thereon, be rotated relative to the weld head to obtain proper relative orientation. Such rotation is cumbersome, time consuming and often restricted by available throat depth of the weld head. The prior art arrangement does not lend itself to rapid, efficient operation nor to automation of the welding operation.

Slip rings have been employed in the past for passing current through rotating connections. Such arrangements have been employed for low current circuits, currents having a magnitude considerably less than required for welding, and thus have not been adapted to application for high current resistant welding applications. Slip rings or other prior rotating contact arrangements may introduce a relatively high resistance at such contacts, which is acceptable because of the continuous motion. However, if a high welding current were to be applied through such contacts while they were not moving, the relatively high resistance at the contact junction could tend to weld the contacts.

Accordingly, it is an object of the present invention to provide for resistance welding in a manner and with apparatus that avoids or eliminates above mentioned problems.

SUMMARY OF THE INVENTION

In carrying out the principles of the present invention in accordance with a preferred embodiment thereof, a pair of electrodes is mounted in a pair of aligned rotatably mounted bobbins with each electrode being pressed into electrical contact with one of the bobbins and electrically insulated from the other. Electrical contacts are firmly pressed into hard sliding contact with the respective bobbins which are electrically insulated from one another so that current can flow from the bobbins between the electrodes. The bobbins are mounted for rotation in a weld head so that a minimum of electrical resistance is provided between the contacts and the bobbins.

BRIEF DESCRIPTION OF THE DRAWINGS

In the accompanying drawings:

FIG. 3 is a vertical sectional view taken along lines 3—3 of FIG. 1;

FIG. 4 is a sectional view taken along lines 4—4 of FIG. 3;

FIG. 5 is a sectional view taken along lines 5—5 of FIG. 3; and

FIG. 6 is a sectional view taken along lines 6—6 of FIG. 4.

DESCRIPTION OF THE PREFERRED EMBODIMENT

Figure 1:
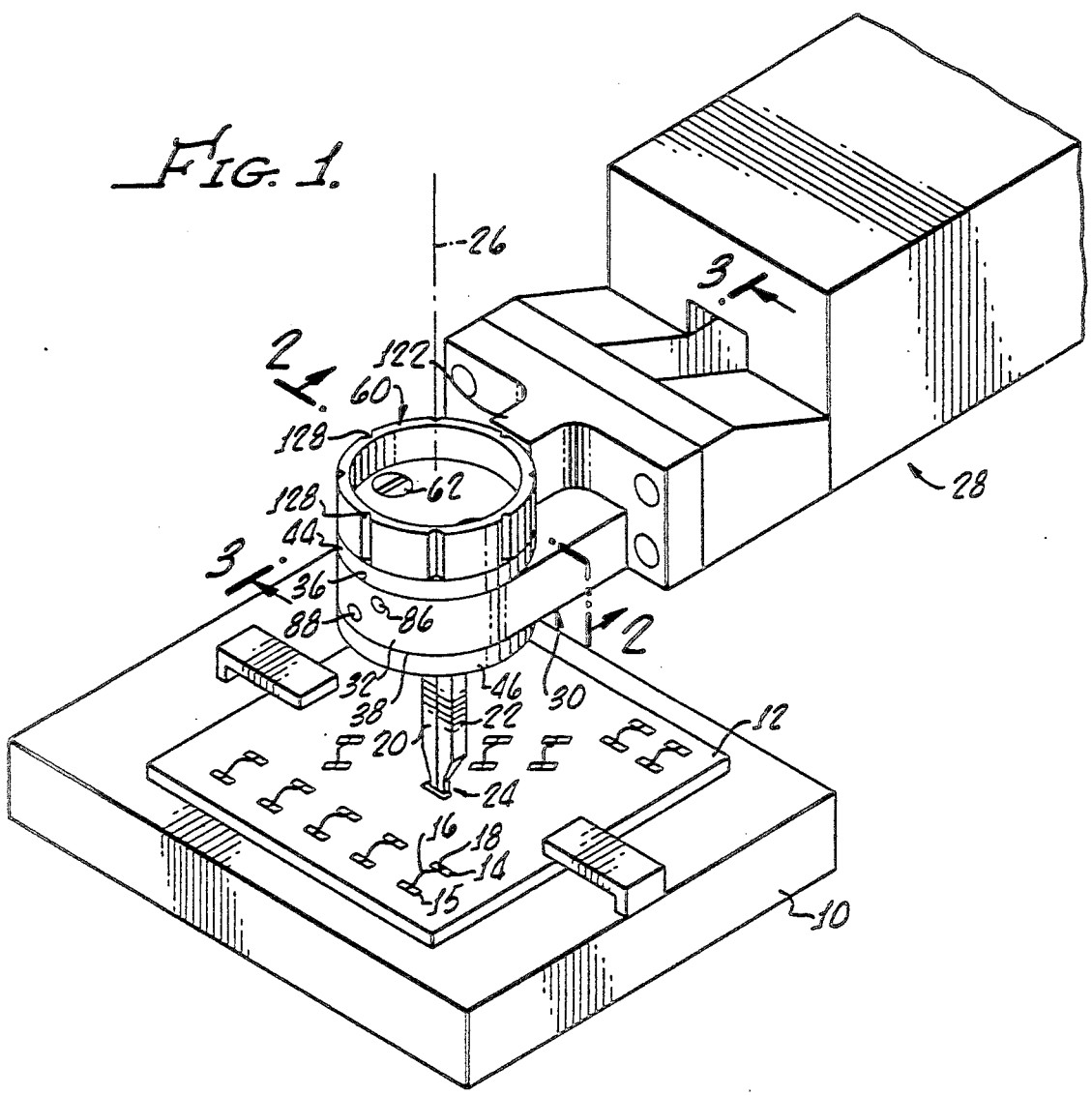
FIG. 1 is a pictorial illustration of a welding head employing rotatable duo-tip electrodes in position to weld electronic components.

Referring now to FIG. 1, a work table 10 is movably mounted for motion in X and Y directions upon a support (not shown) and has secured thereto a workpiece 12 upon which are mounted electronic circuit components such as those indicated at 14 and 15, for example. Pairs of such components 14, 15 are interconnected by electrical wires such as wire 16, of which the ends are welded to the respective components 14, 15.

To achieve a weld at a point such as point 18, between one end of wire 16 and component 14, a dual tip (duo-tip) electrode assembly is employed. The electrode assembly comprises first and second elongated, mutually insulated and fixedly interconnected electrodes 20, 22 having decreased area tips generally indicated at 24. The electrode assembly is positioned so that a line from one of the electrode tips to the other has a predetermined orientation with respect to one end of the wire to be welded. For example, it is preferred that an imaginary line from one of the electrode tips to the other be perpendicular to the length of a wire to be welded when the electrode tips are positioned at the wire end where it contacts the component. Accordingly, for accomplishment of the welding, the electrode tips are pressed against the component and wire so as to span the end of the interconnecting wire. While the electrodes remain in contact with the wire, a high welding current is passed through the electrodes, from one electrode to the other, and thus through the wire and component which bridge the two electrodes to accomplish the desired resistance welding of the wire end to the component.

Figure 2:
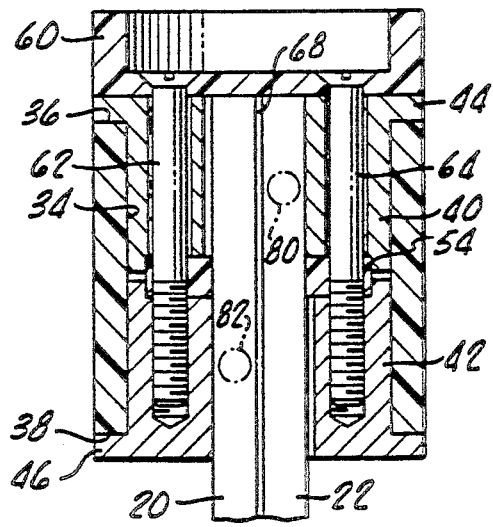
FIG. 2 is a sectional elevation taken along lines 2—2 of FIG. 1.

Because a workpiece must be specifically aligned with the dual electrodes, it has been the practice in the past to rotate the work table 10 about a Z axis, perpendicular to the X,Y axes of linear motion of the table. The present invention avoids rotating the entire work table to different positions of angular orientation with respect to the electrodes. To this end, the electrode pair 20, 22 is mounted for rotation about a vertical axis 26 in a welding head generally indicated at 28. The welding head is mounted on a support (not shown) which is fixedly connected with respect to the support upon which the table 10 is movably mounted. The electrode welding head includes an electrode support arm 30 having a curved end 32 which has a right circular cylindrical bore 34 (FIGS. 2, 3) extending vertically through the support arm 30 and having upper and lower end surfaces 36, 38.

Mounted within the bore 34 of the electrode support arm are a pair of mutually aligned, vertically stacked bobbins 40, 42 having circumferentially extending radially projecting flanges 44, 46, respectively, on oppositely disposed outer ends thereof. Flanges 44, 46 abut the respective bobbin end surfaces 36, 38. Each bobbin, at its inner end, is formed with a shallow recess 50, 52 of a circular configuration which cooperate with one another to receive a short cylinder or circular disk 54 of an insulative material. Insulating disc 54 is snugly captured in both of the recesses 50, 52 to hold the two bobbins 40, 42 slightly apart and electrically insulated from one another, and yet to hold them in mutual axial alignment.

The bobbins are formed of a suitable material of high electrical conductivity and strength. Their outer surfaces have greatly increased electrical conductivity, provided by means of a gold plating or gold coating formed on the circularly cylindrical outer surfaces thereof.

A thumb wheel 60 having a diameter substantially equal to the diameter of the bobbin flanges is mounted atop the stacked bobbins. The assembly of bobbins and thumb wheel, with interposed insulating disk 54, is rigidly secured together, and thereby rotatably secured in the bore of support arm 30, by a pair of screws 62, 64 (FIG. 2) extending through the thumb wheel and through the upper bobbin 40 into threaded engagement within apertures formed in lower bobbin 42.

The bobbins are formed with mutually aligned electrode receiving apertures extending axially therethrough. The apertures have a dual rectangular cross-section to receive the dual rectangular cross-section electrodes and the electrical insulating strip 68 that is interposed between the electrodes. Thus, in lower bobbin 42 (FIG. 5), one part of the axially extending aperture is configured and dimensioned to snugly receive one electrode 20 which, accordingly, is in firm electrical contact with the lower bobbin. Lower bobbin 42 also has a second rectangular aperture portion indicated at 70, which is configured and dimensioned to receive the second electrode 22. But aperture portion 70 is dimensioned to be greater than the external dimensions of the electrode 22 so that the latter can extend through aperture section 70 without contact therewith. Thus, electrode 22 is insulated from lower bobbin 42 by the space between the electrode and bobbin.

In a similar manner, upper bobbin 40 (see FIG. 4) has a first aperture portion 74 that is configured and dimensioned to snugly receive second electrode 22 which is thus in firm electrical contact therewith and has a second aperture portion 76 which has greater dimensions than the dimensions of the first electrode 20 so that the latter will extend through the aperture portion 76 without contact with any part of the upper bobbin 40. Thus, the electrode assembly extends axially through the pair of stacked bobbins. The two bobbins are identical to one another except for the relative opposite hand disposition of electrode receiving apertures.

Although it is convenient to make the electrode assembly with both electrodes 20 and 22 of the same length, it will be readily understood that electrode 20, which is connected to the lower bobbin, but not to the upper bobbin, may be shorter. This electrode may have a length, from its welding tip, only sufficient to extend through the lower bobbin 42.

Threaded in the bobbins 40, 42 are upper and lower set screws 80, 82 having ends bearing on the respective electrodes 22 and 20, respectively. Suitable apertures 86, 88 are provided in the end 32 of electrode support arm 30 to allow access by a tool to rotate the set screws 80, 82. The latter may be turned to firmly press the respective electrodes 22 and 20 against the walls of the apertures in the electrically conductive bobbins, thus ensuring good electrical contact between the bobbins and the respective electrodes.

As noted above, bolts 62, 64 hold the assembly of thumb wheel and upper and lower bobbins together with the interposed insulated disc 54, and firmly but rotatably mount the entire assembly of bobbins, electrodes and thumb wheel in bore 34 of electrode support arm 30 by holding bobbin flanges 44, 46 against upper and lower surfaces 36, 38 of the electrode support arm.

A metallic electrically conductive contact 89, formed of an elongated conductive rod, and having an enlarged head 92, extends through an insulated grommet 94 in the weld support arm and is threadedly received in an electrically conductive connector 96 to which is electrically and mechanically connected a first weld current conducting cable 98. A spring 100 is compressed between the contact head 92 and grommet 94 and strongly urges the contact head 92 against the gold plated surface of bobbin 40. Preferably, contact head 92 is plated with a highly electrically conductive silver alloy.

An identical contact assembly is provided for lower bobbin 42 and comprises a contact rod 104 having a silver alloy plated head 106 that is urged firmly into contact with lower bobbin 42 by a spring 108 that is compressed between the bobbin head and the non-conductive grommet 110 through which rod 104 extends. The distal end of contact rod 104 is threaded in a connector 112 in which is mechanically and electrically secured a second cable 114 for conducting weld current to the electrodes.

A set screw 120 is threaded in an upper portion 122 of the electrode support arm and carries at an inner end a spring pressed ball detent 124, pressed by a spring 126. The ball 124 is received in temporary latching engagement in one of a plurality of vertically extending slots 128 (see FIG. 1) that are mutually spaced circumferentially around the outer periphery of thumb wheel 60. Thus, the electrodes can be rotated by manual rotation of the thumb wheel and will be temporarily locked in place by the spring pressed ball detent 124.

In order to monitor welding voltage, the voltage at each of the bobbins is detected by electrical spring probes mounted in the electrode support arm. Thus a first spring probe 140 (FIG. 6) is mounted in a bore 142 within the support arm and includes a contact head 144 that is pressed upwardly into sliding contact with a lower surface of flange 44 of upper bobbin 40 by means of a compression spring 146. An electrical lead 148 connects this probe to suitable monitoring equipment (not shown). Similarly, for the bobbin 42, an electrical probe 150 is mounted in a bore 152 of the electrode support and includes a head 154 that is spring pressed by means of a spring 156 into sliding contact with the upper surface of flange 46 of bobbin 42. An electrical connecting lead 158 is connected from probe 150 to suitable monitoring equipment (not shown).

With the described arrangement, contact heads 92, 106 are strongly and firmly pressed against the highly conductive surfaces of the bobbins in any position of rotation of the bobbins. The electrode assembly is maintained in a fixed, stationary position while weld current is applied. Thus, because of the good electrical contact between the bobbins and contacts, the high welding current which is passed between these elements in a non-moving condition of the elements is not likely to cause any arcing or welding at such contact points. If deemed necessary or desirable, resistance at the junction of the contact heads 92, 106 and the respective bobbins 40, 42 can be further decreased by forming the contact heads with a concave configuration that matches the curvature of the bobbin exteriors, thereby increasing the contact area between the contact heads and the bobbins, and thus further ensuring that minimal resistance at this junction.

The spring loading of the contacts against the bobbins allows relatively free rotation of the bobbins by use of the thumb wheel and thus there is little restriction on the angular orientation of the electrodes. Such rotational mounting of the electrodes greatly simplifies use of the dual tip welding apparatus, eliminates accidental damage due to cumbersome workpiece rotation, and increases the efficiency and throughput of the welding apparatus. Preferably, the detent slots of the thumb wheel are positioned at 45° intervals to facilitate tip orientation angles most often encountered.

With this intermittent angular motion capability of the electrodes, workpiece movement is required only in X and Y translations and no rotation of the workpiece is necessary. Such an arrangement will greatly facilitate automation of the welding operation.

In an exemplary embodiment, insulator 54 between the bobbins is made of fiberglass, and the indexing thumb wheel is made of acetal as are bolts 62, 64.

Access holes 86, 88 in the electrode holder arm are positioned to allow access to the set screws 80, 82 when the rotatable assembly is in a home or 0° position. The arrangement allows welding to be done in any rotational position from 0° to 360°.

What is claimed is:

1. A method for mounting welding electrodes and welding a lead to an electronic circuit component comprising the steps of:
   mounting a pair of cylindrical axially aligned bobbins in a weld support arm for rotation relative to the arm,
   mounting a pair of mutually spaced and mutually insulated electrodes in said bobbins with at least one of said electrodes extending through both of the bobbins,
   holding the first bobbin in contact with the first electrode and the second bobbin in contact with the second electrode,
   insulating the electrodes from each other,
   insulating the first electrode from the second bobbin and the second electrode from the first bobbin,
   firmly pressing first and second electrical contacts against said first and second bobbins, respectively,
   rotating the bobbins and the electrodes relative to the weld support arm to a desired orientation relative to the circuit components to be welded,
   moving the weld head into position at a lead to be welded, and
   applying welding current to said first and second contacts to cause welding current to flow through said bobbins and electrodes to the lead being welded.

2. The method of claim 1 including the steps of pressing first and second voltage feedback wires against said first and second bobbins, respectively, and employing said feedback wires to monitor voltage at the electrodes.

3. The method of claim 1 wherein said step of mounting electrodes comprises positioning said electrodes to extend axially of said bobbins.

4. The method of claim 1 including the step of maintaining the electrodes and bobbins stationary during application of welding current.

5. Apparatus for welding electronic circuit components comprising:
   a welding head having a welding arm,
   a pair of mutually insulated electrodes,
   means for mounting the electrodes to the electrodes to the electrode support arm for intermittent angular motion about a rotation axis to a plurality of different angular orientations, said mounting means comprising first and second electrically conductive bobbins mutually aligned along said axis, said bobbins being electrically insulated from one another and each being in electrical contact with one of said electrodes and electrically insulated from the other, and
   means for applying welding current to said electrodes.

6. The apparatus of claim 5 wherein said means for applying welding current comprises first and second contacts extending radially of said bobbins and in low resistance slidable contact therewith, and means for resiliently pressing said contacts against said bobbins.

7. The apparatus of claim 5 wherein said means for applying welding current to said electrodes includes said bobbins and first and second electrical contacts having tight slidable electrical contact with respective ones of said bobbins.

8. The apparatus of claim 5 including first and second mutually facing shallow recesses formed in adjacent sides of said first and second bobbins, an insulator mounted in said recesses, and means for axially securing said bobbins to one another.

9. The apparatus of claim 5 wherein each said bobbin has a circumferentially extending outwardly projecting flange, said welding arm having upper and lower surfaces received between said flanges.

10. The apparatus of claim 9 including electrical probe means mounted in said welding arm and in electrical contact with said bobbin flanges for sensing voltage in said bobbins.

11. Apparatus for welding electronic circuit components comprising:
   a welding head having a welding arm with a bobbin mounting bore,
   a pair of mutually insulated electrodes, and
   means for mounting the electrodes to the electrode support arm for intermittent angular motion about a rotation axis to a plurality of different angular orientations, said means for mounting the electrodes to the welding arm comprising first and second mutually aligned bobbins received in said bore and electrically insulated from one another, and means for securing said first and second electrodes in said first and second bobbins, respectively.

12. The apparatus of claim 11 wherein said means for securing said electrodes in said bobbins comprises means mounted in the bobbins for pressing each electrode against an associated one of said bobbins.

13. Welding apparatus comprising:
   a weld head, a welding arm fixed to the weld head and extending therefrom, said welding arm having a bobbin receiving bore extending therethrough, first and second mutually aligned bobbins mounted in said bore and insulated from one another, said bobbins having axially extending apertures formed therein, first and second elongated side-by-side electrodes extending through said bobbin apertures and being mutually insulated from one another, means for holding said first electrode in electrical contact with said first bobbin, said first electrode being insulated from said second bobbin, means for holding said second electrode in electrical contact with said second bobbin, said second electrode being insulated from said first bobbin, first and second contacts mounted in said welding arm, each said contact having a contact head in close electrical sliding contact with a respective one of said bobbins, means for resiliently urging said contacts into tight contact with said bobbins, and means for angularly moving said bobbins and electrodes to different options of angular orientation with respect to said weld support arm.

14. The apparatus of claim 13 wherein said welding arm has upper and lower surfaces, each said bobbin having an outer circumferentially extending radially projecting flange in contact with a respective one of said upper and lower welding arm surfaces, and means for securing said bobbins to one another to rotatably hold said welding arm between the bobbin flanges.

15. The apparatus of claim 13 wherein said means for moving comprises a thumb wheel fixed to said bobbins and means for latching said bobbins in different positions of angular orientation with respect to said welding arm.

16. The apparatus of claim 13 wherein each bobbin has a recess formed in a side thereof facing the other bobbin, and means for electrically insulating said bobbins from ne another and for maintaining mutual axial alignment thereof, said means for insulating and maintaining axial alignment comprising a nonconductive disk received in both said recesses.

17. Apparatus for welding electronic circuit components comprising:

a pair of elongated parallel and closely spaced electrodes fixed to and mutually insulated from one another, upper and lower mutually aligned bobbins, said lower bobbin having an axially extending aperture therein that closely receives said first electrode and having a second axially extending aperture that receives said second electrode in spaced relation thereto, said upper bobbin having an axially extending aperture therethrough that closely receives said second electrode and having a second axially extending aperture that receives said first electrode in spaced relation thereto, means for pressing said first electrode into firm electrical contact with said first bobbin, means for pressing said second electrode into firm electrical contact with said second bobbin, means for securing said bobbins to one another in mutually spaced nonconductive relation, an electrode support arm, and means for mounting said bobbins and electrodes in said support arm for intermittent limited rotation about a rotation axis substantially parallel to said electrodes.

18. The apparatus of claim 17 including a thumb wheel secured to said bobbins for effecting limited rotation of said bobbins and electrodes, and detent means cooperating with said thumb wheel for holding said bobbins and electrodes in a selected position of angular orientation.

* * * * *